Feb. 19, 1957 A. W. GARDES 2,781,619
METHOD OF MAKING FILTER CARTRIDGE
Filed Sept. 3, 1953 3 Sheets-Sheet 1
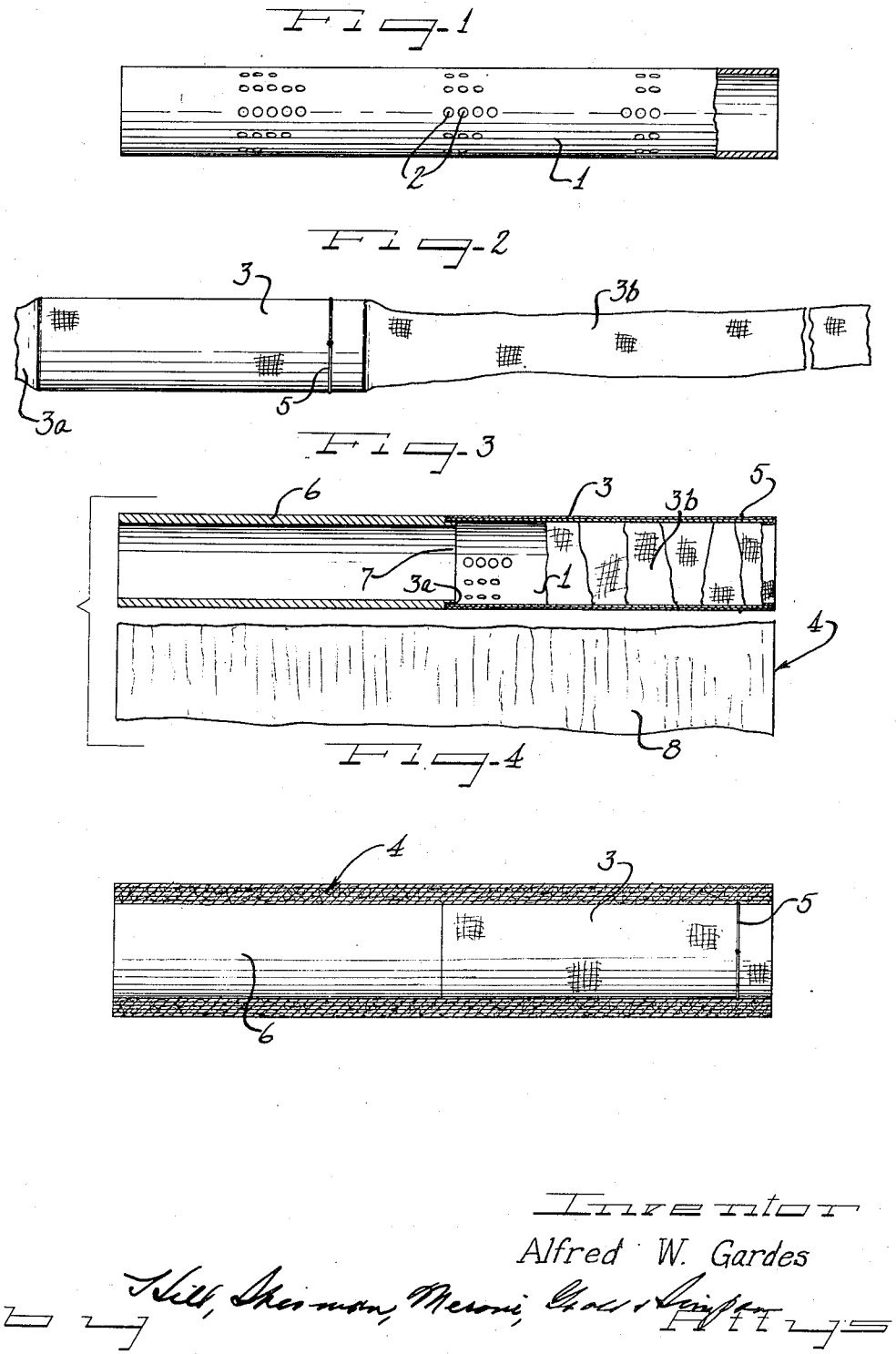
Inventor
Alfred W. Gardes Feb. 19, 1957 A. W. GARDES 2,781,619
METHOD OF MAKING FILTER CARTRIDGE
Filed Sept. 3, 1953 3 Sheets-Sheet 2
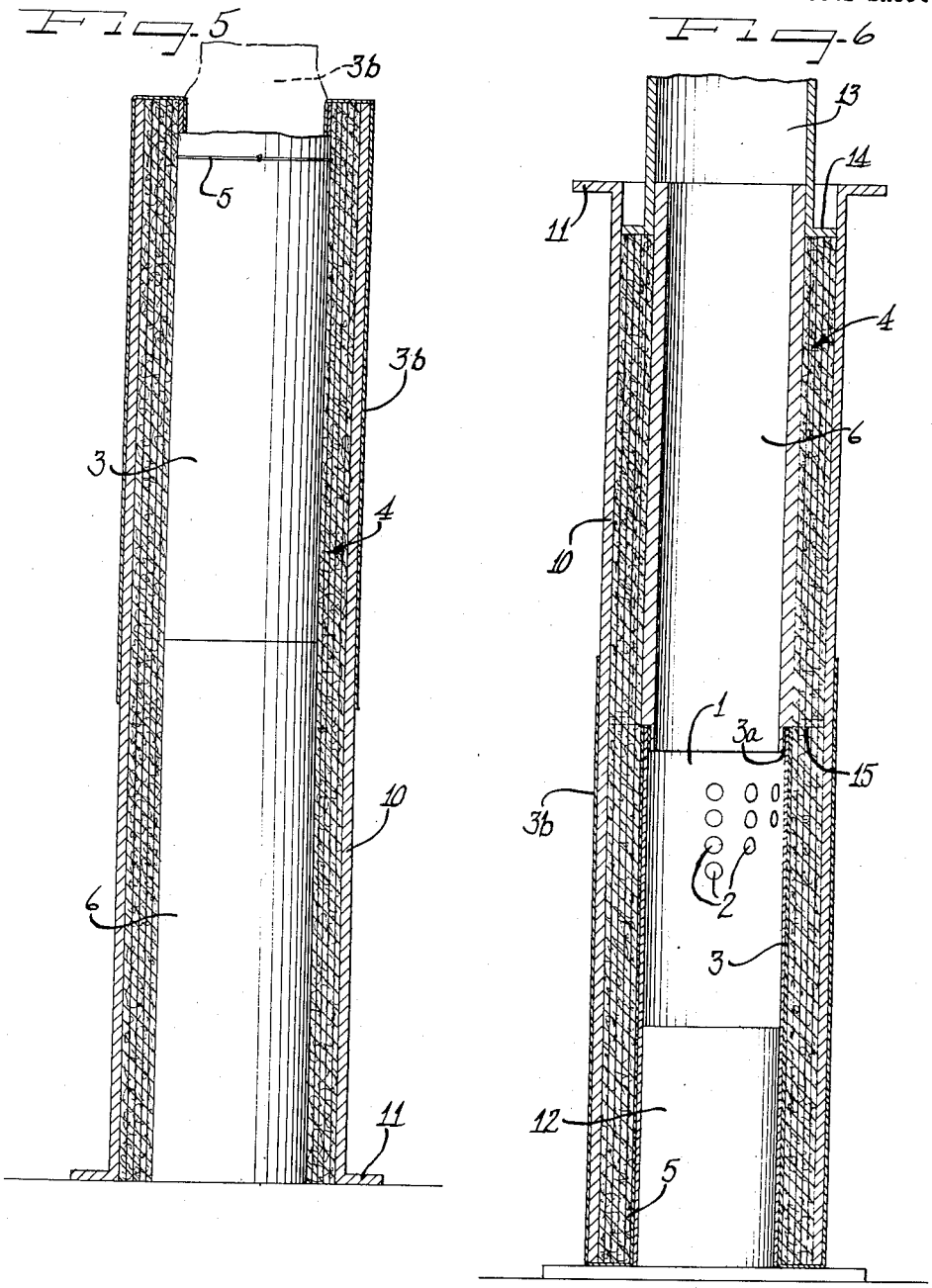
Inventor
Alfred W. Gardes

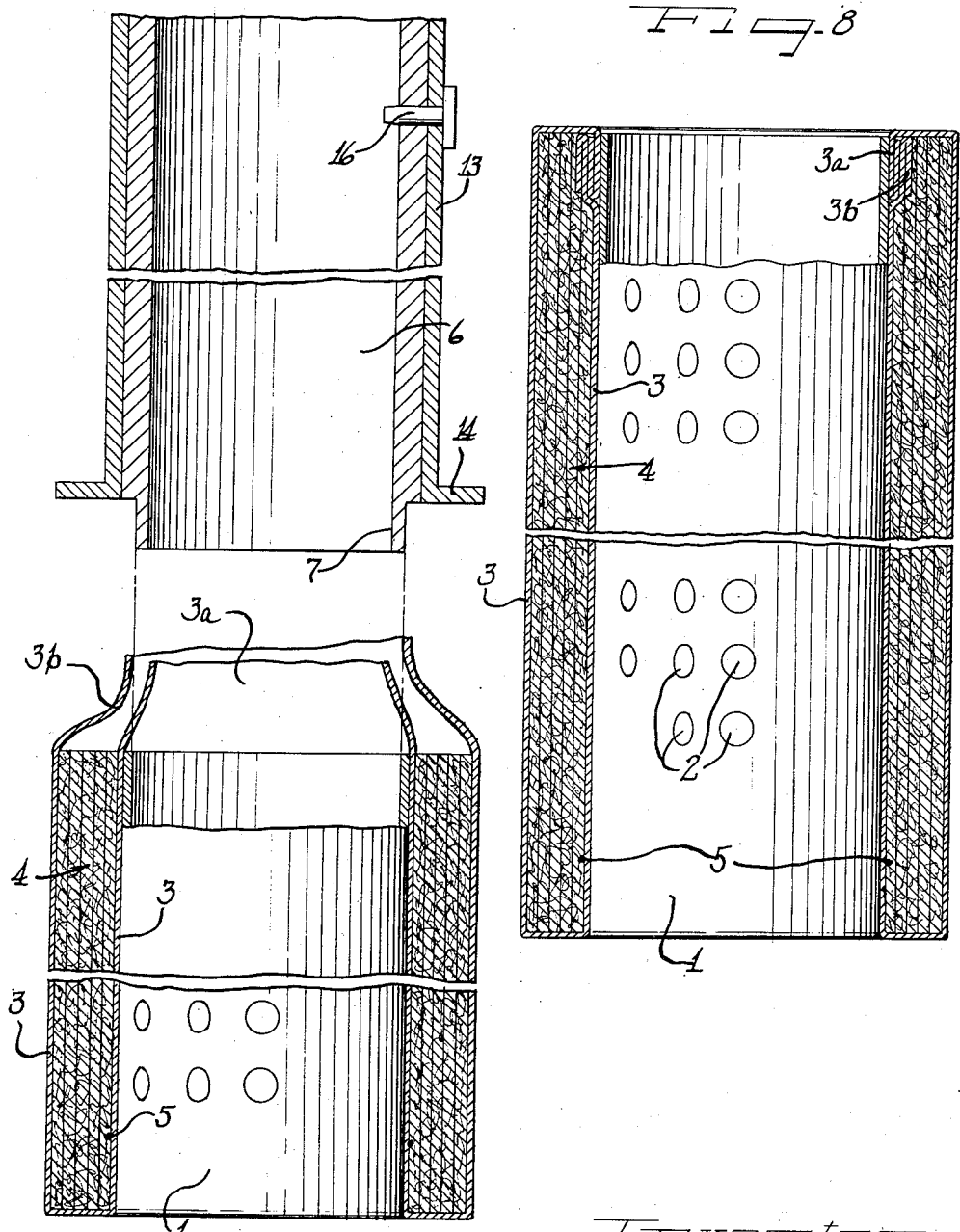

2,781,619

METHOD OF MAKING FILTER CARTRIDGE

Alfred W. Gardes, Detroit, Mich., assignor to Indiana Commercial Filters Corporation, a corporation of Indiana Application September 3, 1953, Serial No. 378,203

1 Claim. (Cl. 53—13)

This invention relates to improvements in a filter cartridge and method of making the same, and more particularly to a cartridge of the disposable type which is completely discarded after becoming contaminated to a predetermined degree, and a new cartridge substituted for it, the cartridge being of the character insertable in a casing for the filtration of a fluid, such for example as lubricating oil, although it will be satisfactory for the filtration of other oils, or other liquids, as will be apparent to one skilled in the art.

More particularly, the invention relates to a filter cartridge which may be said to be of the soft type, that is, there is no rigid or metallic casing surrounding the cartridge or forming an outer covering for it. Cartridges of this type are most frequently slipped inside a filter casing, over an upstanding perforated center outlet tube, the liquid to be filtered passing radially through the cartridge and the filtrate exiting through that center outlet tube.

Obviously, uniform density, high efficiency, and a long life before replacement are desiderata in connection with cartridges of this character. It has been found that cartridges wherein the filter medium or material itself is compressed axially of the cartridge during forming or thereafter are desirable for efficiency and long life, as well as economical production. However, in the past, extreme difficulty has been experienced in providing such a cartridge wherein the liquid being filtered may flow laterally after passing through only a portion of the filter medium, and before passing through the next portion of the medium, such lateral flow giving much better distribution, eliminating clogging at specific locations, and preventing channeling. Most frequently heretofore axially compressed cartridges were made by merely compressing a mass of material, and such procedure did not provide uniform density but in most cases gave a product in which channeling occurred too readily. Further, in the manufacture of a filter cartridge of the general character herein set forth, many variables occur such as variations in the quantity of filter material used, variations in the pressure applied, etc. Former methods of production did not overcome the adverse effect of these variables, and particularly so where a quantity of filtering material was stuffed into a cylinder and compressed to size, because the filtering material could not be of uniform density or substantially so prior to the compression, and obviously not of uniform density thereafter. Difficulty has also been experienced in economically providing a highly efficient filter cartridge.

With the foregoing in mind, it is an important object of the instant invention to provide a disposable filter cartridge of the soft type which is highly efficient, easily handled, and economical to both manufacture and use.

Another object of the invention is the provision of a disposable filter cartridge in which the filter medium itself is axially or endwise compressed and yet there are a plurality of locations within the cartridge where the liquid passing radially therethrough may flow laterally or sidewise before passing radially through the next portion of the filter medium.

Also a feature of the invention is the provision of a disposable filter cartridge in which the filter medium itself is wound spirally around a core member, and then compressed axially of the cartridge.

It is also a feature of the invention to provide a disposable filter cartridge wherein the filter medium is wound spirally, and both radially and axially compressed.

Still another object of the invention resides in the provision of a new and novel method of making a disposable filter cartridge.

A further object of the invention resides in the provision of a filter cartridge of the disposable type which is initially formed substantially twice as long as desired, and then compressed axially to the desired ultimate size.

While some of the more salient features, characteristics and advantages of the instant invention have been above pointed out, others will become apparent from the following disclosures, taken in conjunction with the accompanying drawings, in which—

Figure 1 is a part elevational part sectional view of the center tube of the cartridge;

Figure 2 is a view of the center tube of Fig. 1 covered with the flexible fabric wrapping of the cartridge;

Figure 3 is a fragmentary sectional view of the structure of Fig. 2, showing a temporary forming member associated with the center tube and indicating the start of the rolling operation;

Figure 4 is a part elevational part sectional view of a further step in the forming of the cartridge, after the rolling has been completed;

Figure 5 is a part sectional part elevational view of another step in the forming of the cartridge;

Figure 6 is a part sectional part elevational view of a still further step in the forming of the cartridge;

Figure 7 is a fragmentary part vertical sectional part elevational view illustrating the withdrawal of the last elements of the forming mechanism from the nearly completed cartridge; and Figure 8 is a central vertical sectional view, with a core member shown partially in elevation of the completed filter cartridge, embodying principles of the instant invention.

As shown on the drawings:

With reference first to Fig. 8 of the drawings, it will be seen that the illustrated embodiment of the completed filter cartridge includes a core tube or member 1 provided with numerous perforations as indicated at 2. This core tube 1 may be made of any suitable material, rigid fiber board being satisfactory. The fiber board may be impregnated with a resin or any other suitable material to render it oil impervious. The perforations 2 are in the center portion of the core member, leaving the end portions of this member solid for a distance preferably equivalent to half the diameter of the completed cartridge.

Immediately adjacent the core member is one portion of a stretchable fabric covering 3, which completely encloses a filter medium generally indicated by numeral 4 spirally wound around the core member. This filter medium or material 4 is preferably in sheet form and made of any suitable substance, a cellulosic compound embodying redwood fiber and cotton waste being highly satisfactory, although other suitable substances may be utilized. In the completed cartridge, the filter medium 4 is completely encased by the stretchable fabric covering 3, which may satisfactorily be a knit stocking-like material.

In the formation or making of the cartridge, the core member 1 is disposed horizontally as indicated in Fig. 1. This core member is covered with the tubular fabric 3 in the manner illustrated in Fig. 2. A suitable cord or wire 5 is utilized to secure the fabric to the core member adjacent one end of the core member. The core member is inserted inside the fabric near one end thereof, leaving a short fabric end 3a projecting beyond one end of the core member, and a long portion of the fabric 3b projecting from the end of the core member adjacent which the wire 5 is provided.

In the next step of the operation, the short end 3a of the fabric tube is turned inside the core member 1, and a forming tool 6 is associated with the core member by means of telescoping a reduced end 7 on the tube 6 inside the core member, this end 7 holding the folded in end portion 3a of the fabric in position. The tool 6 is merely a tube of metal or any suitable material used during the forming of the cartridge. The long fabric end 3b is stuffed inside the opposite end of the core member, all as seen clearly in Fig. 3. As indicated diagrammatically in this same figure, the fiber medium 4 in the form of an elongated sheet or strip 8 is then wound around both the fabric covered core member 1 and the tool 6, in a spiral manner, until a desired thickness of filtering medium is established, and the structure will then have the appearance of the showing in Fig. 4. During the winding operation, the filter medium 4 is compressed radially of the resultant cartridge, or in other words, in a manner to reduce the initial thickness of the sheet 8. Preferably, the general fiber alignment of the batt-like sheet 8 is longitudinally of the sheet as indicated diagrammatically in Fig. 3, so that the compression during rolling proceeds in keeping with this fiber alignment.

After the structure is rolled to the form seen in Fig. 4, the entire cylindrical assembly is disposed inside a forming cylinder 10 having a flange 11 at its lower end. The rolled up assembly of Fig. 4 is merely slipped inside the forming cylinder 10, with the tool 6 downward. Then the longer end 3b of the fabric cover 3 is pulled out of the core member 1 as indicated by the dotted lines at the top of Fig. 5, and this end 3b is then retroverted downwardly over the outside of the forming cylinder 10 as far as it will go.

The entire structure of Fig. 5 is then inverted and disposed over an upstanding post or support 12 to the position seen in Fig. 6. Another forming tool 13 flanged as at 14 to fit between the tool 6 and the cylinder 10 is disposed on top of the round filter medium 4, and is then forced downwardly by a suitable press until the flange reaches the dotted line position indicated at 15 substantially even with the top of the core member 1. This compresses the filter mass 4 axially to substantially one-half its originally rolled length. Referring back to the showing in Fig. 3, it will be seen that the fiber alignment of the filter medium is still circumferentially of the filter cartridge, and while the filter medium has been compressed to a considerable extent, the fiber alignment thereof has not been disturbed so that the resultant filter pack is of substantially uniform density and channeling is effectively eliminated.

The next step in the process is the withdrawal of the forming cylinder 10 from between the now compressed filter mass and the retroverted long end 3b of the fabric cover 3. This may be accomplished with the use of a suitable clip connecting the flange 11 of the cylinder 10 to an element on the press.

Just prior to the withdrawal of the cylinder 10, the outer tool 13 is pinned to the inner tool 6 as indicated at 16 in Fig. 7, by a simple pin extending through apertures in these tools. These two tools 6 and 13 are then withdrawn in unison from between the two ends 3a and 3b of the compressed filter pack as seen in Fig. 7.

Thereafter, with a suitable spatulate tool the end portions 3a and 3b are turned inwardly between the filter mass and the outer surface of the core member 1 to the position seen in Fig. 8. Contemporaneously with the turning in of these end portions of the tubular cover, cementitious material of a suitable character is applied to the region of fold so as to unite these end portions together and to the core tube 1 to prevent axial expansion of the cartridge. The cartridge is then completed.

It will be noted that the filter medium itself during the formation of the cartridge has been compressed both radially and axially of the cartridge, but the layers of the medium are still intact. During use, therefore, liquid passing radially through the filter cartridge may travel laterally between each adjacent layer, and thus full and even distribution is established and channeling eliminated. The cartridge is highly efficient by virtue of its novel formation, is extremely long lived, in that contaminants are dispersed in the filter medium to a considerable depth, and not all the contaminants merely accumulated on the outside surface of the medium, and the entire structure is highly economical to manufacture and use.

It will be understood that modifications and variations may be effected without departing from the scope of the novel concepts of the present invention.

I claim as my invention:

The method of making a filter cartridge, including the steps of placing a tubular perforated core inside one end of an elongated tubular cover of stretchable fabric, securing the cover to the core with a part of the fabric extending therebeyond, joining a tool to one end of the core to provide in effect a longer core, rolling a unitary sheet of filter medium around both the fabric cover core and tool, compressing the filter medium during rolling to reduce its original thickness, retroverting the extended part of the fabric cover over the outside of the wound filter medium, restraining the filter medium from radial expansion and compressing the filter medium axially inside the retroverted cover to substantially the length of the core to form an uninterrupted filter medium of uniform density, and folding in both ends of the cover between the filter medium and the core at the same end of the cartridge.

References Cited in the file of this patent

UNITED STATES PATENTS

| | | |
|---|---|---|
| 2,301,121 | Kamrath | Nov. 3, 1942 |
| 2,334,664 | Wicks | Nov. 16, 1943 |
| 2,501,652 | Barrickman | Mar. 28, 1950 |
| 2,521,833 | Dahl | Sept. 12, 1950 |
| 2,550,070 | La Brecque et al. | Apr. 24, 1951 |
| 2,626,057 | Clabaugh | Jan. 20, 1953 |
| 2,672,984 | Russell | Mar. 23, 1954 |
| 2,683,500 | Goodloe | July 13, 1954 |